United States Patent
Yachi et al.

[11] Patent Number: 6,105,426
[45] Date of Patent: Aug. 22, 2000

[54] TUNING FORK TYPE VIBRATION ELEMENT AND TUNING FORK TYPE VIBRATION GYRO

[75] Inventors: Masanori Yachi; Hiroshi Ishikawa; Yoshio Satoh; Kazutsugu Kikuchi, all of Kanagawa, Japan

[73] Assignees: Fujitsu Limited, Kawasaki; Fujitsu Towa Electron Limited, Yokohama, both of Japan

[21] Appl. No.: 09/066,904

[22] Filed: Apr. 28, 1998

[30] Foreign Application Priority Data

Dec. 18, 1997  [JP]  Japan .................................. 9-349738

[51] Int. Cl.[7] .................................................. G01C 19/00

[52] U.S. Cl. .................... 73/504.16; 73/504.04; 310/370

[58] Field of Search ........................... 73/504.16, 504.04; 310/311, 312, 313 A, 326, 370, 321, 570

[56] References Cited

U.S. PATENT DOCUMENTS

| | | | |
|---|---|---|---|
| Re. 33,479 | 12/1990 | Juptner et al. | 73/504.16 |
| 4,410,827 | 10/1983 | Kogure | 310/370 |
| 4,538,461 | 9/1985 | Juptner et al. | 73/504.16 |
| 4,540,909 | 9/1985 | Takahashi et al. | 310/370 |
| 4,592,663 | 6/1986 | EerNisse et al. | 374/117 |
| 5,451,828 | 9/1995 | Tomikawa et al. | 310/370 |
| 5,533,397 | 7/1996 | Sugitani et al. | 73/504.16 |
| 5,635,642 | 6/1997 | Nonomura et al. | 73/504.16 |

*Primary Examiner*—Richard A. Moller
*Attorney, Agent, or Firm*—Armstrong, Westerman, Hattori, McLeland & Naughton

[57] ABSTRACT

In a tuning fork type vibration element provided in a tuning fork type vibration gyro, the sum of inertial moments of a base to an inertial moment of two arms is 1.0 or larger. The inertial moment of the two arms is obtained by multiplying the square of a rotation radius, which is a distance from a center axis of torsional vibration as a center position between the two arms to a center of gravity of the two arms with a mass of the two arms, and the inertial moment of the base is obtained by multiplying the square of the rotation radius from the center axis of the same torsional vibration.

9 Claims, 18 Drawing Sheets

TUNING FORK TYPE VIBRATION ELEMENT AND TUNING FORK TYPE VIBRATION GYRO

BACKGROUND OF THE INVENTION

1. Field of the Invention

The present invention relates to a tuning fork type vibration element comprising two arms which form a tuning fork and vibrate torsionally, and a base which supports these two arms, and to a tuning fork type vibration gyro comprising such a tuning fork type vibration element so as to detect the rotation angular velocity.

2. Description of the Prior Art

Gyroscope has been used as means for identifying the position of the moving object such as airplane, large vessel, space satellite, and the like. Recently, it is utilized for detecting vibration of apparatus such as car navigation, VTR, still camera, and the like in civil field.

Among these gyroscopes, a vibration gyro made by utilizing a piezoelectric element has been in practical use. The piezoelectric vibration gyro is made by utilizing the principle that, when a rotation angular velocity is exerted to an object which is vibrating at a predetermined rate, Coriolis force is formed in the orthogonal direction to the vibration. Various types of such piezoelectric vibration gyro have been proposed. Above all, recently, research and development of tuning fork type vibration gyro utilizing the piezoelectric monocrystal has been made vigorously, seeking for the downsizing and shortening of gyros.

FIG. 1 is a perspective view of the general structure of a tuning fork type vibration element 1 used for a tuning fork type vibration gyro. The tuning fork type vibration element 1 includes two arms 2, 3 of rectangular parallelepiped form having square bottom face, and a base 4 of rectangular parallelepiped form supporting the arms 2, 3. These arms 2, 3 and the base 4 are formed in one-piece by a piezoelectric monocrystal such as $LiTaO_3$, $LiNbO_3$, or the like. The tuning fork type vibration element 1 having this structure is attached to an object whose rotation angular velocity is supposed to be detected, and the arms 2, 3 are vibrated torsionally. When the rotation angular velocity is exerted to the object, an electromotive force generated by Coriolis force which is formed in the orthogonal direction to the torsional vibration is detected, so as to detect the rotation angular velocity of the object.

FIG. 2 shows how the tuning fork type vibration element 1 vibrates torsionally. In FIG. 2, the arrows indicate the direction of the torsional vibration, the positions of the arms 2, 3 before and after the torsional vibration are indicated by dot lines and solid lines, respectively. When the torsional vibration shown in FIG. 2 is generated, the vibration causes not only the arms 2, 3, but also the base 4 to rotate. In this case, there is a problem that the support unit (node unit) of the tuning fork type vibration element 1 supports only the center of the rotation, so that the support for the external vibration is weakened. On the other hand, if the support is reinforced, there is a problem that the Q value is decreased.

In order to solve these problems, the tuning fork type vibration element 1 having the structure shown in FIG. 3 has been proposed. The tuning fork type vibration element 1 has an H-type structure including two arms 12, 13 which are provided on the opposite side of the base 4 in addition to the arms 2, 3. In the tuning fork type vibration element 1 having this H-type structure, the rotation of the base 4 is prevented by generating torsional vibration by each pair of the arms 2, 3 and the arms 12, 13, thereby forming double torsional conditions with two torsional vibrations. As a result, the support for the external vibration is facilitated, thereby enhancing the Q value of the torsional vibration.

However, according to the H-type tuning fork type vibration element 1 shown in FIG. 3, there is a problem that the arms 12, 13 lengthen the entire length of the vibration element 1, failing to meet the demand for a smaller and shorter tuning fork type vibration element gyro. There is another problem that balancing the upper arms 2, 3 and the lower arms 12, 13 makes the processing of the arms hard and lowers the productivity, thereby leading to increase in the processing cost and the component cost.

BRIEF SUMMARY OF THE INVENTION

The main object of the present invention is to provide a tuning fork type vibration element which can enhance the Q value without lengthening its entire length and has good productivity, and further to provide a tuning fork type vibration gyro which utilizes such a tuning fork type vibration element.

The tuning fork type vibration element of the present invention comprises two arms which form a tuning fork and vibrate torsionally and a base which supports the two arms, wherein the sum of the inertial moments of the base to an inertial moment of the two arms is 1.0 or larger, the inertial moment of the two arms being obtained by multiplying the square of the distance from the center axis of the torsional vibration of the two arms to the center of gravity of the two arms with the mass of the two arms, and the inertial moment of the base being obtained by multiplying the square of the rotation radius from the center axis of the torsional vibration with the partial mass of the base.

In such a tuning fork type vibration element, the ratio of the width of the base to the width of the arm is 1.0 or larger. In such a tuning fork type vibration element, the length of the base is longer than the length of the arms. In such a tuning fork type vibration element, the base includes a base main body and one or more addition mass units, and the base main body and the addition mass unit form the inertial moments of the base. The addition mass unit has hardness of 50 $kg/cm^2$ or more. In such a tuning fork type vibration element, the base further includes an adhesive unit for adhering the base main body to the addition mass unit, the adhesive unit having hardness of 50 $kg/cm^2$ or more within a use temperature range. In such a tuning fork type vibration element, a support member is provided at the substantial center of the rotation movement of the base, so as to support the base.

The principle of the present invention will be described as follows. When the support unit suppresses the torsional vibration of the tuning fork type vibration element 1 shown in FIG. 2, or when the support unit reduces the energy leak of the vibration, the moment M which is generated by the arms 2, 3 is considered to be expressed by the following equation of motion (1).

$$M = I \times (d^2\theta/dt^2) + K\theta \quad (1)$$

In this equation,

θ: the rotation angle of the base 4 generated by the torsional vibration

K: the repulsion of the support unit (involving damping)

I: the sum of the inertial moments of the base 4 from the rotation axis of the torsional vibration (more specifically shown by the following equation (2))

$$I = \int r_1^2 dm_1 + \int r_2^2 dm_2 + \ldots + \int r_n^2 dm_n \quad (2)$$

$r_i$ (1≦i≦n): the i-th rotation radius of the base 4

$m_i$ (1≦i≦n): the i-th partial mass of the base 4

These equations show that the movement of the base 4 can be reduced by increasing the sum of the inertial moments I, thereby decreasing θ representing the rotation movement of the base 4, so that the base 4 can be less affected by the support unit. Thus, θ can be decreased by increasing the inertial moments of the base 4, and as a result, the tuning fork type vibration element 1 with a high Q value can be realized without employing the H-type structure (as shown in FIG. 3) with a long entire length and poor productivity.

According to the tuning fork type vibration element 1 of the present invention, the Q value is increased by making the ratio of the sum of the inertial moments of the base to the inertial moment of both the arms 1.0 or larger. As a means for enlarging the inertial moments of the base, the sizes of the arms and the base can be changed. To be more specific, the ratio of the width of the base to the width of the arms is made to be equal to or larger than a predetermined ratio and/or the base is made longer than the arms.

As another means for enlarging the inertial moments of the base, the base can be provided with one or more addition mass units by considering that it is not necessary to generate the inertial moments by a piezoelectric element. However, the addition mass unit must be a rigid body having hardness of 50 kg/cm$^2$ or more, in order to generate the inertial moments. The adhesion unit for adhering the addition mass unit to the base also must have hardness of 50 kg/cm$^2$ or more like the addition mass unit.

It is preferable to provide a support member for supporting the base at the rotation center, in order to increase the Q value.

By the above-mentioned structure, the tuning fork type vibration element of the present invention obtains the high Q value without lengthening its entire length. In addition, a tuning fork type vibration element having good productivity can be provided. Consequently, by using such a tuning fork type vibration element, a tuning fork type vibration gyro which is small and short and has low cost can be provided.

The above and further objects and features of the invention will more fully be apparent from the following detailed description with accompanying drawings.

DETAILED DESCRIPTION OF THE INVENTION

The embodiments of the present invention will be detailed as follows with reference to the drawings.

Figure 1:
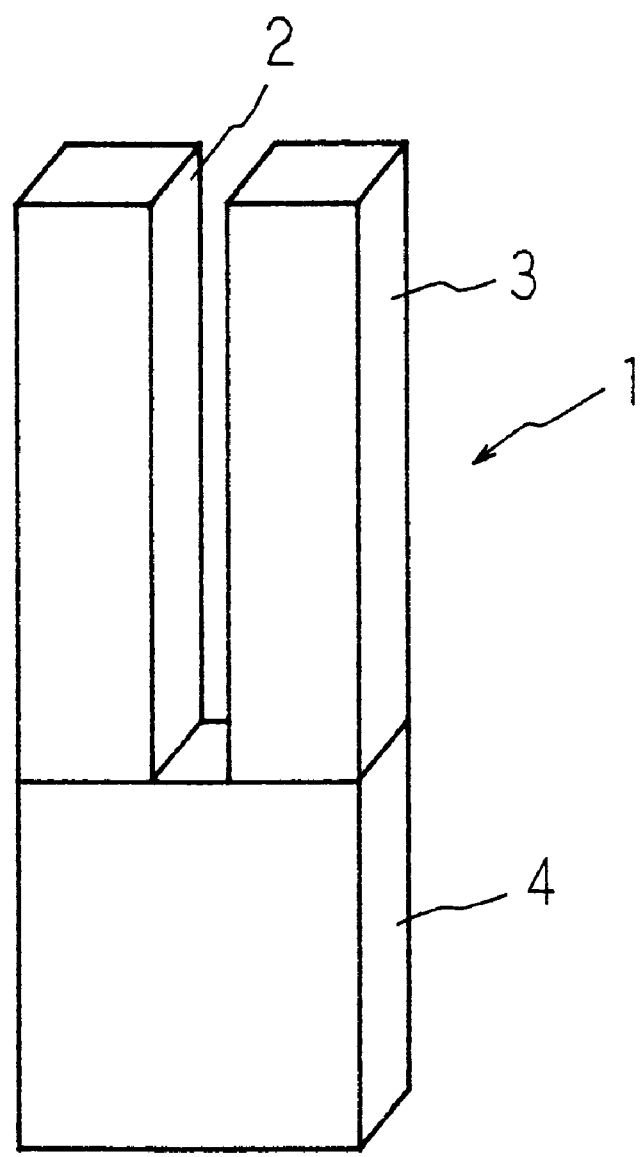
FIG. 1 is a perspective view of the general structure of the tuning fork type vibration element used for a tuning fork type vibration gyro.
Figure 2:
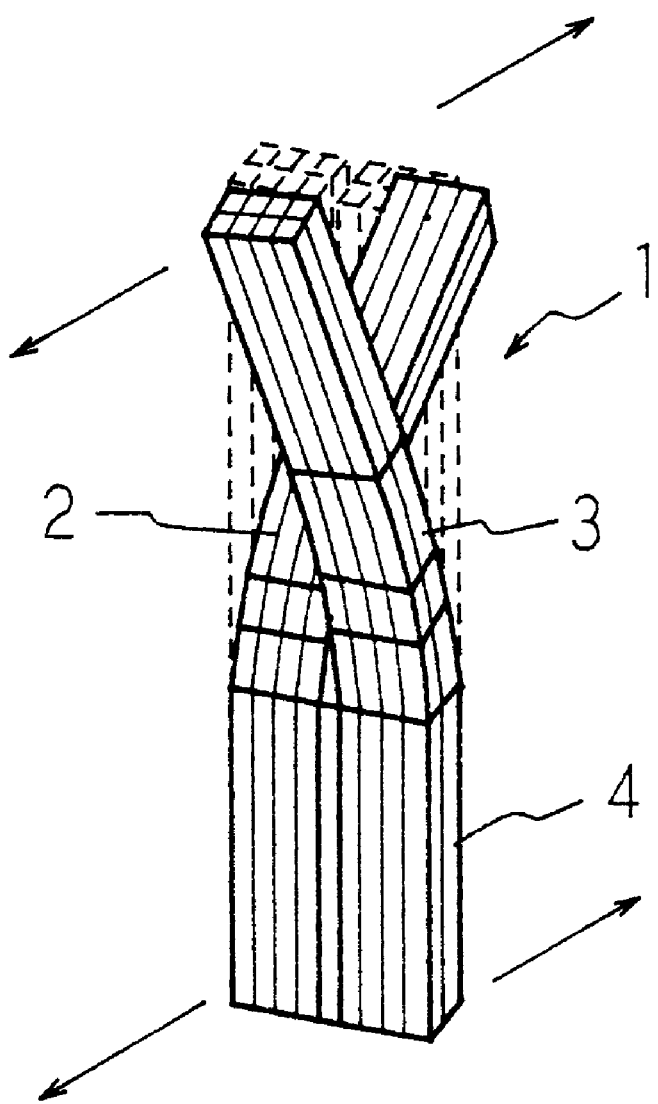
FIG. 2 is a view showing how the tuning fork type vibration element vibrates torsionally.
Figure 3:
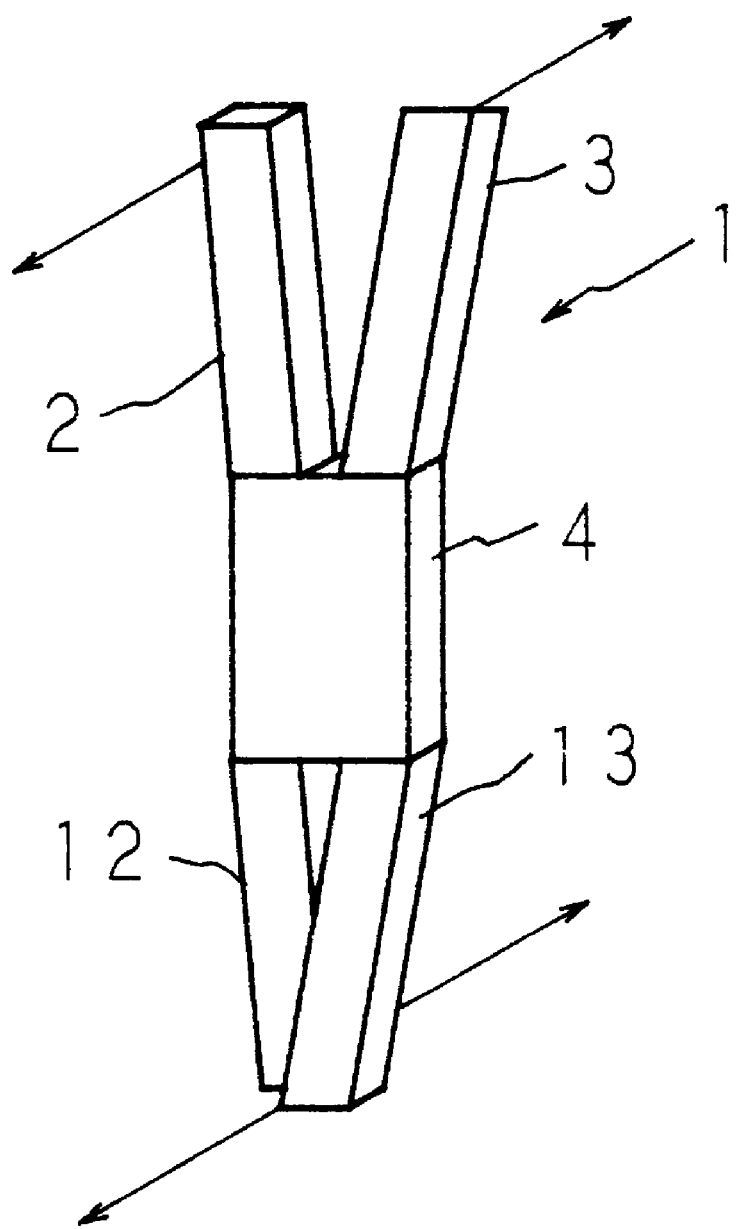
FIG. 3 is a perspective view of the structure of a conventional tuning fork type vibration element.
Figure 4:
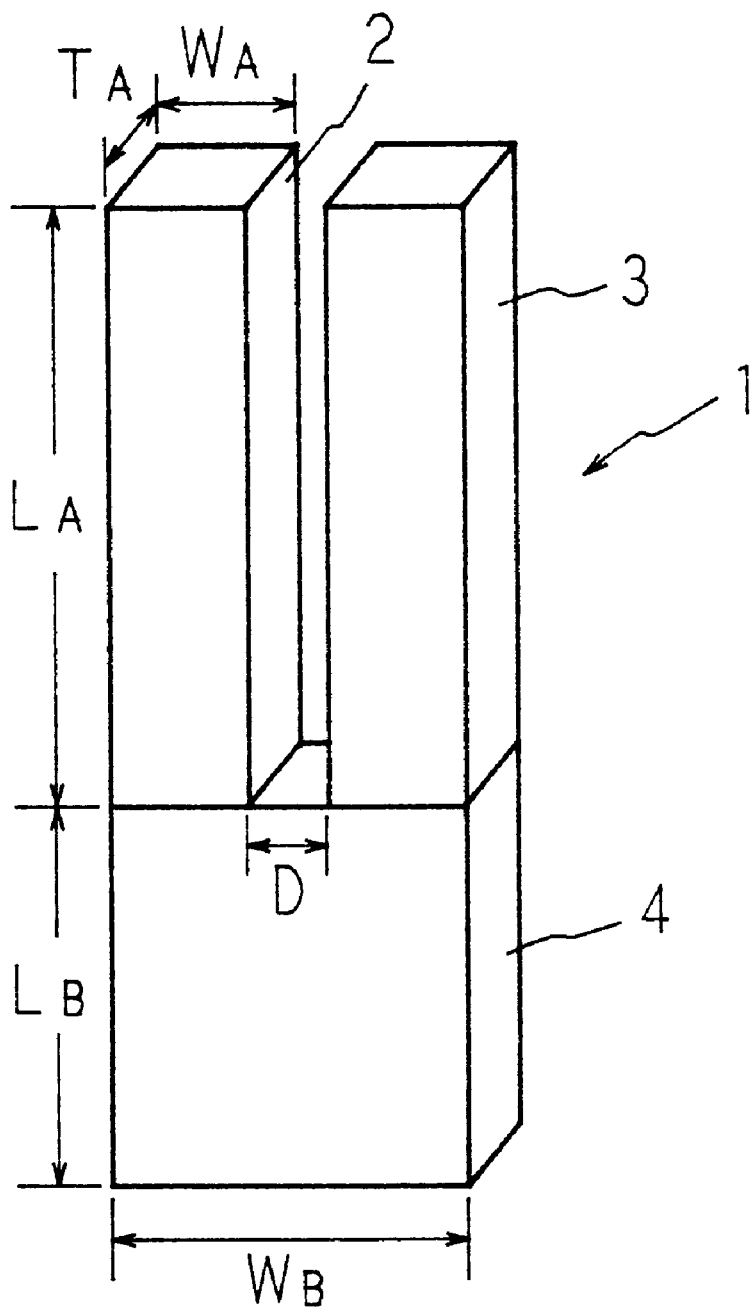
FIG. 4 is a perspective view of the structure of a tuning fork type vibration element of the present invention.

FIG. 4 is a perspective view of the structure of the tuning fork type vibration element of the present invention. The tuning fork type vibration element 1 comprises two arms 2, 3 of rectangular parallelepiped form having square bottom face and a base 4 of rectangular parallelepiped form and supporting these arms 2, 3. The two arms 2, 3 have an identical shape and each has a length (arm length) of $L_A$, a width (arm width) of $W_A$, a thickness (arm thickness) of $T_A$, and a distance (inter-arm distance) of D therebetween. The base 4 has a length (base length) of $L_B$ and a width (base width) of $W_B$.

The tuning fork type vibration gyro including the tuning fork type vibration element 1 thus constructed is attached to an object whose rotation angular velocity is supposed to be detected, and the arms 2, 3 are vibrated torsionally. When the rotation angular velocity is exerted to the object, an electromotive force generated by Coriolis force which is formed in the orthogonal direction to the torsional vibration is detected, so as to detect the rotation angular velocity of the object.

According to the tuning fork type vibration element 1 of the present invention, the sum of the inertial moments of the base 4 to the inertial moment of the arms 2, 3 is 1.0 or larger, and more preferably 1.0 to 9.0. The inertial moment of the arms 2, 3 is calculated by multiplying the square of the rotation radius, which is the distance from the central axis of the torsional vibration as the center position between the arms 2 and 3 to the center of gravity of the arms 2, 3, with the mass of the arms 2, 3. The inertial moment of the base 4 is calculated by multiplying the partial mass of the base 4 with the square of the rotation radius from the central axis of the same torsional vibration.

Figure 5:
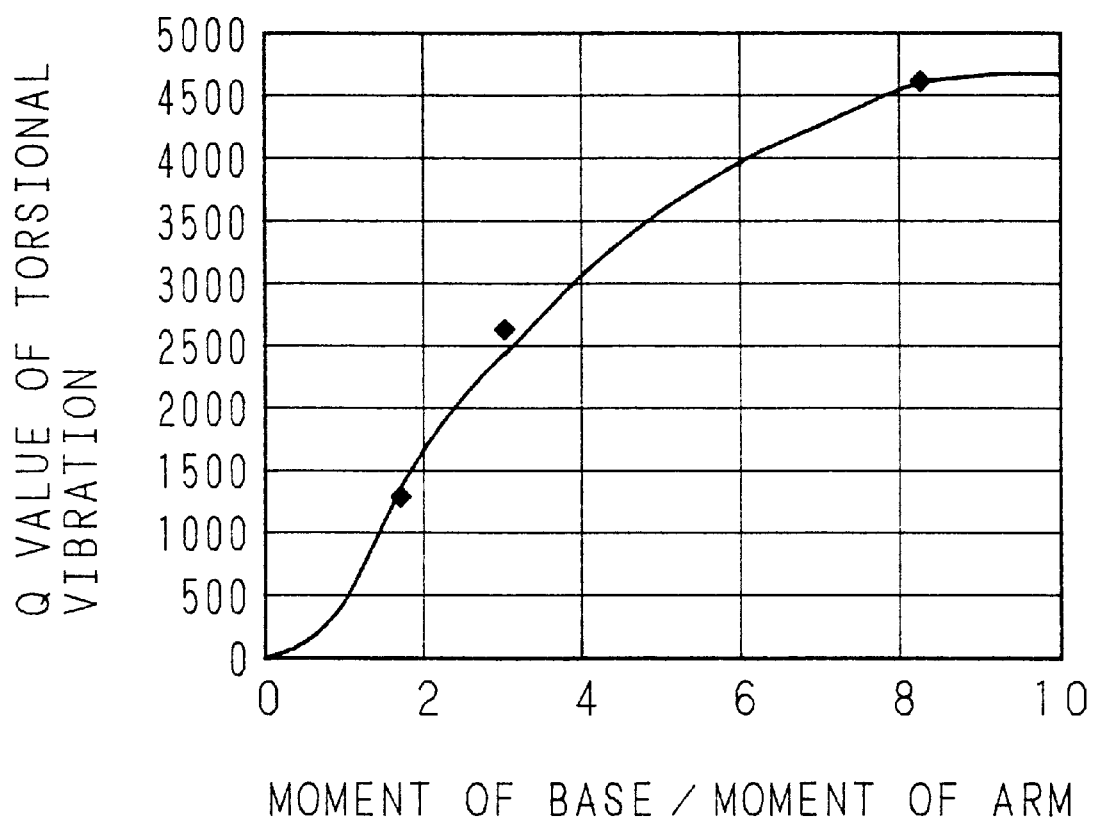
FIG. 5 is a graph showing the relationship between the ratio of the sum of the inertial moments of the base to the inertial moment of the arms and the Q value of the torsional vibration.

FIG. 5 is a graph showing the relationship between the ratio of the sum of the inertial moments of the base to the inertial moment of the arms and the Q value of the torsional vibration. The abscissa shows the value of the ratio and the ordinate represents the Q value, thereby indicating the property of them. As the value of the ratio of the sum of the inertial moments of the base to the inertial moment of the arms becomes larger, the Q value of the torsional vibration increases. When the value of the ratio is 1.0 or larger, the Q value becomes large enough to perform the precise detection of the rotation angular velocity. When the value of the ratio is 9.0 or larger, the Q value is approximately fixed; however, this enlarges the size of the means for increasing the value of the ratio (the base and the addition mass unit), so that it is not preferable for practical use. The most preferable value for the Q value is 2000 or larger for practical use.

The following is a description of the embodiments of the present invention which can obtain a large value of the moment ratio.

EMBODIMENT 1

Figure 6:
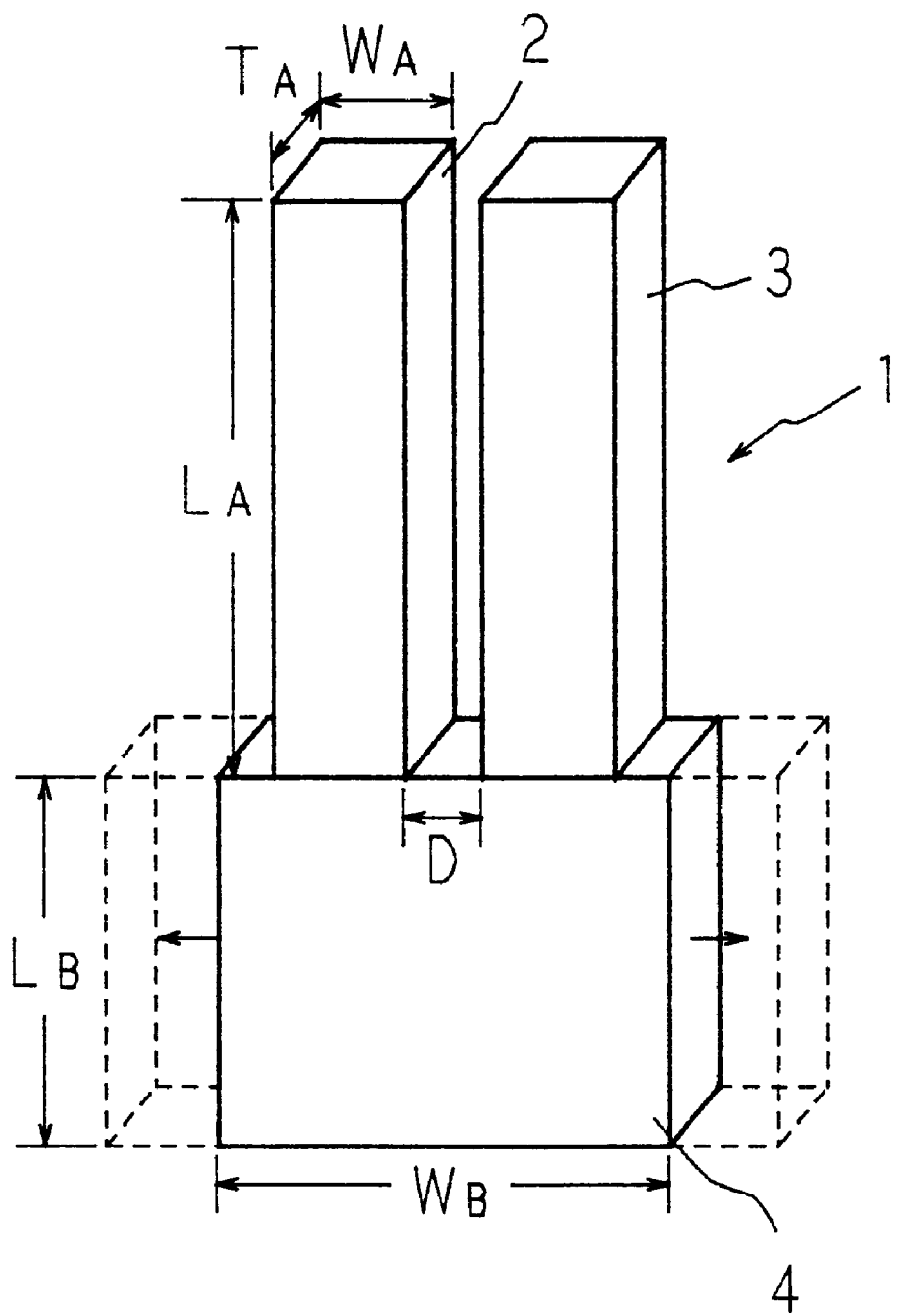
FIG. 6 is a perspective view of the structure of a tuning fork type vibration element of the first embodiment.

As shown in FIG. 6, the first embodiment shows an example where the inertial moment of the base 4 is increased by expanding the width of the base 4 (base width $W_B$) so as to increase the value of the ratio of the above-mentioned moment.

Figure 7:
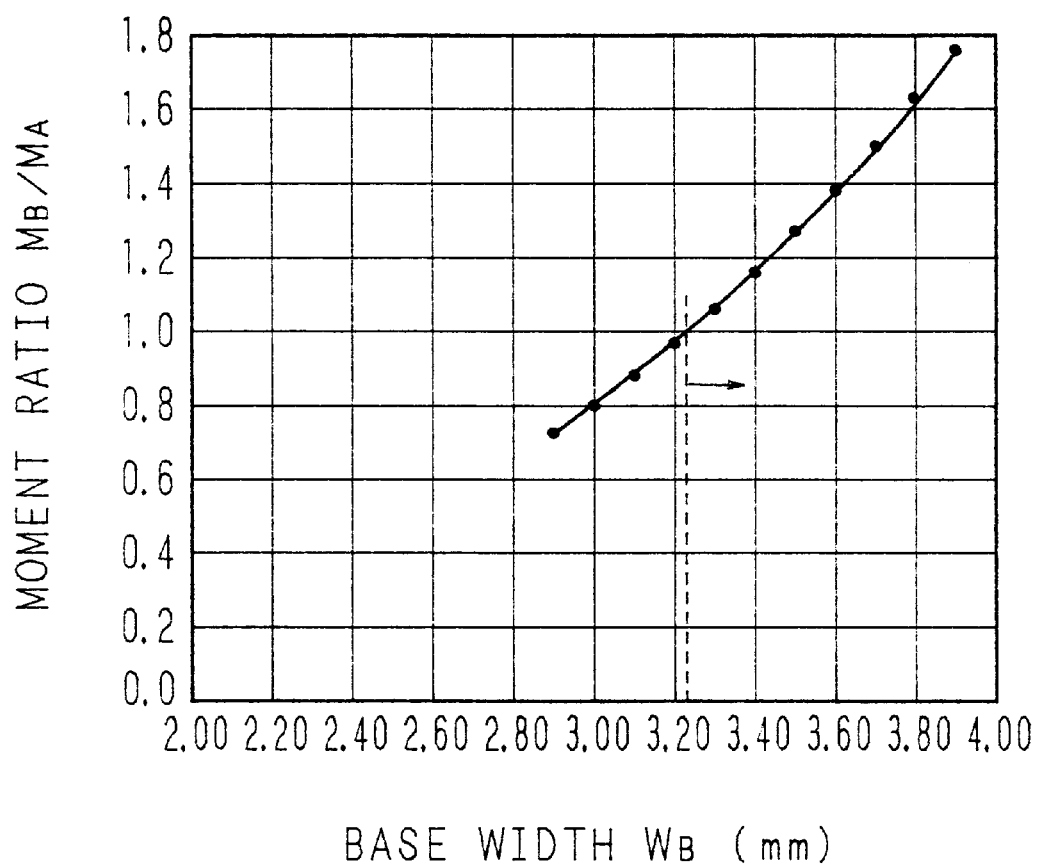
FIG. 7 is a graph showing the relationship between the base width $W_B$ and the moment ratio $M_B/M_A$.

TABLE 1 shows the results of the inertial moment of the arms 2, 3 (arm moment: $M_A$), the sum of the inertial moments of the base 4 (base moment: $M_B$), and the ratio of the base moment to the arm moment (moment ratio: $M_B/M_A$) when the width of the base 4 (base width $W_B$) is varied within the range of 2.90 to 3.90 mm at the intervals of 0.10 mm under the conditions that the sizes of the arms 2, 3 (arm length $L_A$=8.00 mm, arm width $W_A$=1.00 mm, arm thickness $T_A$=1.00 mm, inter-arm distance D=0.45 mm) and the length of the base 4 (base length $L_B$=4.00 mm) are fixed. The relationship between the base width $W_B$ and the moment ratio $M_B/M_A$ shown in TABLE 1 is shown in the graph of FIG. 7 where the abscissa and the ordinate indicate the former and the latter, respectively.

TABLE 1

(unit of lenth: mm)

| $L_A$ | $W_A$ | $T_A$ | $L_B$ | $W_B$ | $M_A$ | $M_B$ | $M_B/M_A$ |
|---|---|---|---|---|---|---|---|
| 8.00 | 1.00 | 1.00 | 4.00 | 2.90 | 31.12 | 22.56 | 0.725 |
| 8.00 | 1.00 | 1.00 | 4.00 | 3.00 | 31.12 | 24.98 | 0.802615933 |
| 8.00 | 1.00 | 1.00 | 4.00 | 3.10 | 31.12 | 27.56 | 0.88558264 |
| 8.00 | 1.00 | 1.00 | 4.00 | 3.20 | 31.12 | 30.31 | 0.974078478 |
| 8.00 | 1.00 | 1.00 | 4.00 | 3.30 | 31.12 | 33.24 | 1.068281807 |
| 8.00 | 1.00 | 1.00 | 4.00 | 3.40 | 31.12 | 36.36 | 1.168370987 |
| 8.00 | 1.00 | 1.00 | 4.00 | 3.50 | 31.12 | 39.66 | 1.274524376 |
| 8.00 | 1.00 | 1.00 | 4.00 | 3.60 | 31.12 | 43.16 | 1.386920333 |
| 8.00 | 1.00 | 1.00 | 4.00 | 3.70 | 31.12 | 46.85 | 1.505737218 |
| 8.00 | 1.00 | 1.00 | 4.00 | 3.80 | 31.12 | 50.76 | 1.631153389 |
| 8.00 | 1.00 | 1.00 | 4.00 | 3.90 | 31.12 | 54.87 | 1.763347206 |

$L_A$: arm length
$W_A$: arm width
$T_A$: arm thickness
$L_B$: base length
$W_B$: base width
$M_A$: arm moment
$M_B$: base moment
$M_B/M_A$: moment ratio As shown in Table 1 and FIG. 7, as the base width $W_B$ increases, the base moment $M_B$ increases, which accordingly increases the moment ratio $M_B/M_A$. By making the base width $W_B$ at least 3.30 mm or larger, the moment ratio $M_B/M_A$ of larger than 1.0 can be realized.

Figure 8:
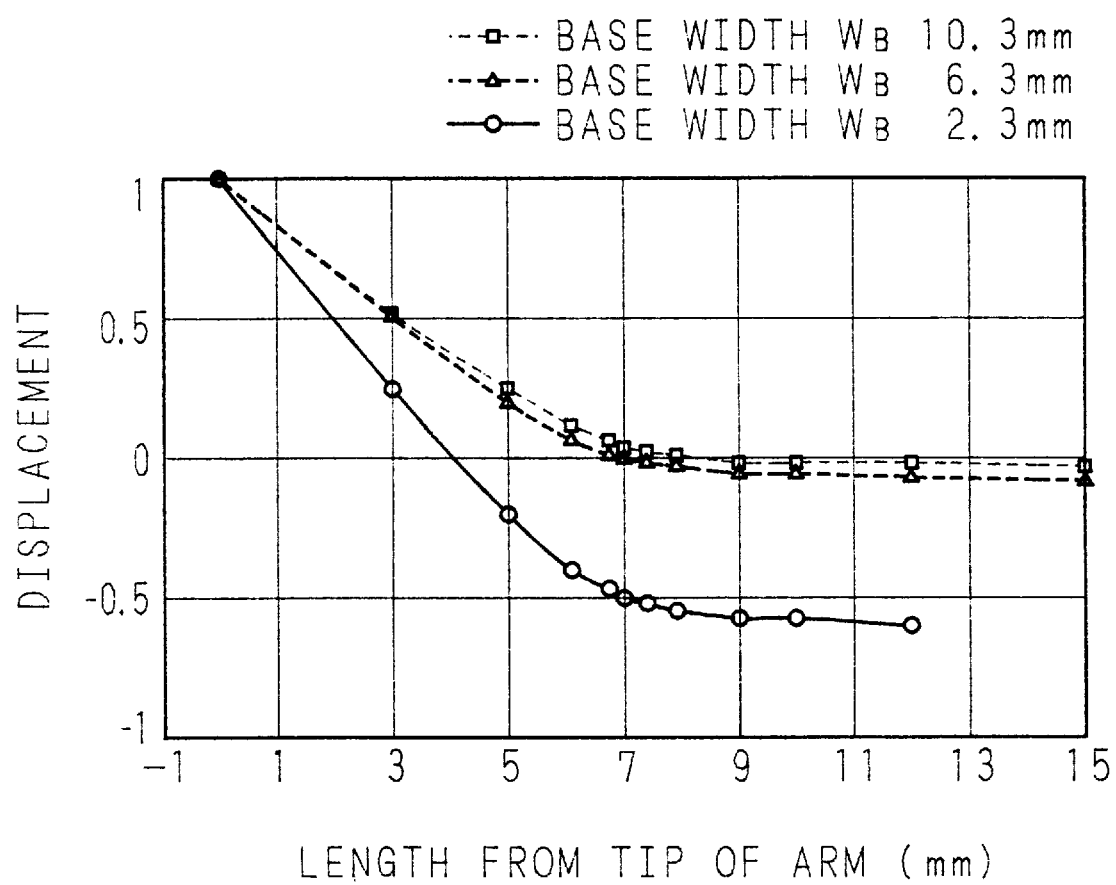
FIG. 8 is a graph showing the relationship between length from the tip of the arms and the displacement of the support unit when the base width $W_B$ is varied.

The displacement of the support unit of the tuning fork type vibration element 1 in the case where the width of the base 4 (base width $W_B$) is varied is simulated. The results are shown in FIG. 8. In the example shown in FIG. 8, the length of the arms 2, 3 (arm length $L_A$) is fixed at 7 mm, and the simulation results of the three base widths $W_B$ are shown with the abscissa representing the length from the tips of the arms 2, 3 and the ordinate representing the displacement of the support unit. The position of 7(mm) on the abscissa indicates the border of the arms 2, 3 and the base 4, the line with the symbols □—□ indicates the base width $W_B$ of 10.3 mm, the line with the symbols △—△ indicates the base width $W_B$ of 6.3 mm, and the line with the symbols ○—○ indicates the base width $W_B$ of 2.3 mm. It is understood that when the inertial moment is increased by expanding the width of the base 4, the rotation of the base 4 becomes fewer and the displacement of the rotation movement becomes smaller.

EMBODIMENT 2

Figure 9:
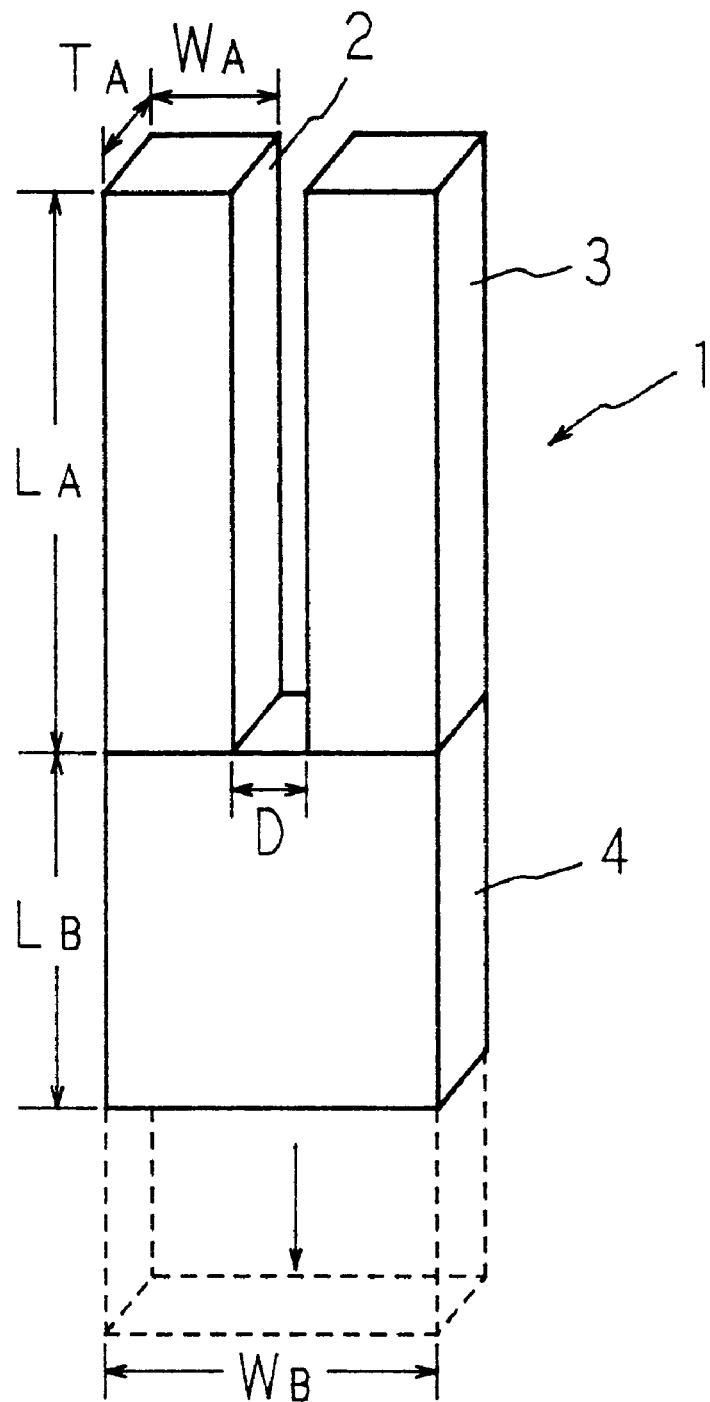
FIG. 9 is a perspective view of the structure of a tuning fork type vibration element of the second embodiment.

As shown in FIG. 9, the second embodiment shows an example where the inertial moment of the base 4 is increased by enlarging the length of the base 4 (base length $L_B$) so as to increase the value of the moment ratio.

Figure 10:
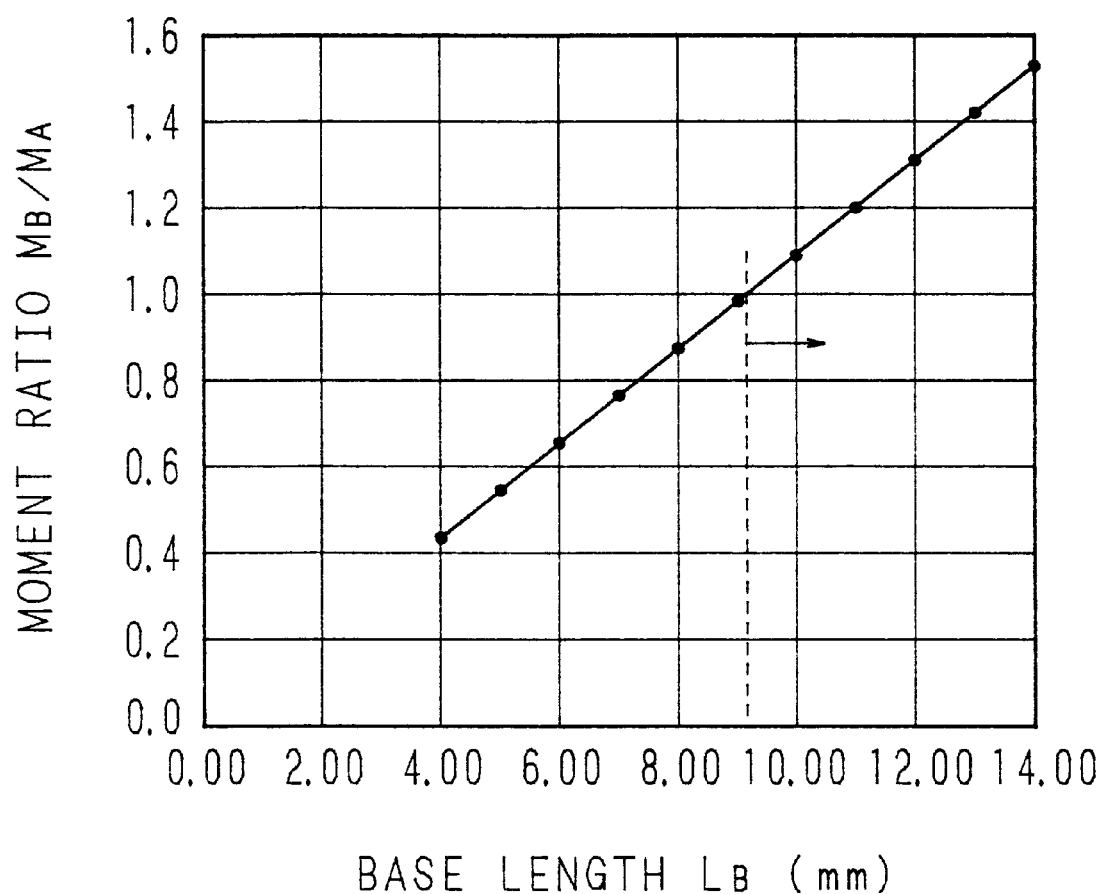
FIG. 10 is a graph showing the relationship between the base length $L_B$ and the moment ratio $M_B/M_A$.

TABLE 2 shows the results of the inertial moment of the arms 2, 3 (arm moment: $M_A$), the sum of the inertial moment of the base 4 (base moment: $M_B$), and the ratio of the base moment to the arm moment (moment ratio: $M_B/M_A$) when the length of the base 4 (base length $L_B$) is varied within the range of 4.00 to 14.00 mm at the intervals of 1.00 mm under the conditions that the sizes of the arms 2, 3 (arm length $L_A$=8.00 mm, arm width $W_A$=1.00 mm, arm thickness $T_A$=1.00 mm, inter-arm distance D=0.45 mm) and the width of the base 4 (base width $W_B$=2.45 mm) are fixed. The relationship between the base length $L_B$ and the moment ratio $M_B/M_A$ shown in TABLE 2 is shown in the graph of FIG. 10 where the abscissa and the ordinate indicate the former and the latter, respectively.

TABLE 2

(unit of lenth: mm)

| $L_A$ | $W_A$ | $T_A$ | $L_B$ | $W_B$ | $M_A$ | $M_B$ | $M_B/M_A$ |
|---|---|---|---|---|---|---|---|
| 8.00 | 1.00 | 1.00 | 4.00 | 2.45 | 31.12 | 13.60 | 0.437161861 |
| 8.00 | 1.00 | 1.00 | 5.00 | 2.45 | 31.12 | 17.00 | 0.546452326 |
| 8.00 | 1.00 | 1.00 | 6.00 | 2.45 | 31.12 | 20.40 | 0.655742791 |
| 8.00 | 1.00 | 1.00 | 7.00 | 2.45 | 31.12 | 23.81 | 0.765033257 |
| 8.00 | 1.00 | 1.00 | 8.00 | 2.45 | 31.12 | 27.21 | 0.874323722 |
| 8.00 | 1.00 | 1.00 | 9.00 | 2.45 | 31.12 | 30.61 | 0.983614187 |
| 8.00 | 1.00 | 1.00 | 10.00 | 2.45 | 31.12 | 34.01 | 1.092904652 |
| 8.00 | 1.00 | 1.00 | 11.00 | 2.45 | 31.12 | 37.41 | 1.202195117 |
| 8.00 | 1.00 | 1.00 | 12.00 | 2.45 | 31.12 | 40.81 | 1.311485583 |
| 8.00 | 1.00 | 1.00 | 13.00 | 2.45 | 31.12 | 44.21 | 1.420776048 |
| 8.00 | 1.00 | 1.00 | 14.00 | 2.45 | 31.12 | 47.61 | 1.530066513 |

$L_A$: arm length
$W_A$: arm width
$T_A$: arm thickness
$L_B$: base length
$W_B$: base width
$M_A$: arm moment
$M_B$: base moment
$M_B/M_A$: moment ratio As shown in TABLE 2 and FIG. 10, as the base length $L_B$ increases, the base moment $M_B$ increases, which accordingly increases the moment ratio $M_B/M_A$. By making the base length $L_B$ at least 10.00 mm or larger, the moment ratio $M_B/M_A$ of larger than 1.0 can be realized.

EMBODIMENT 3

Figure 11:
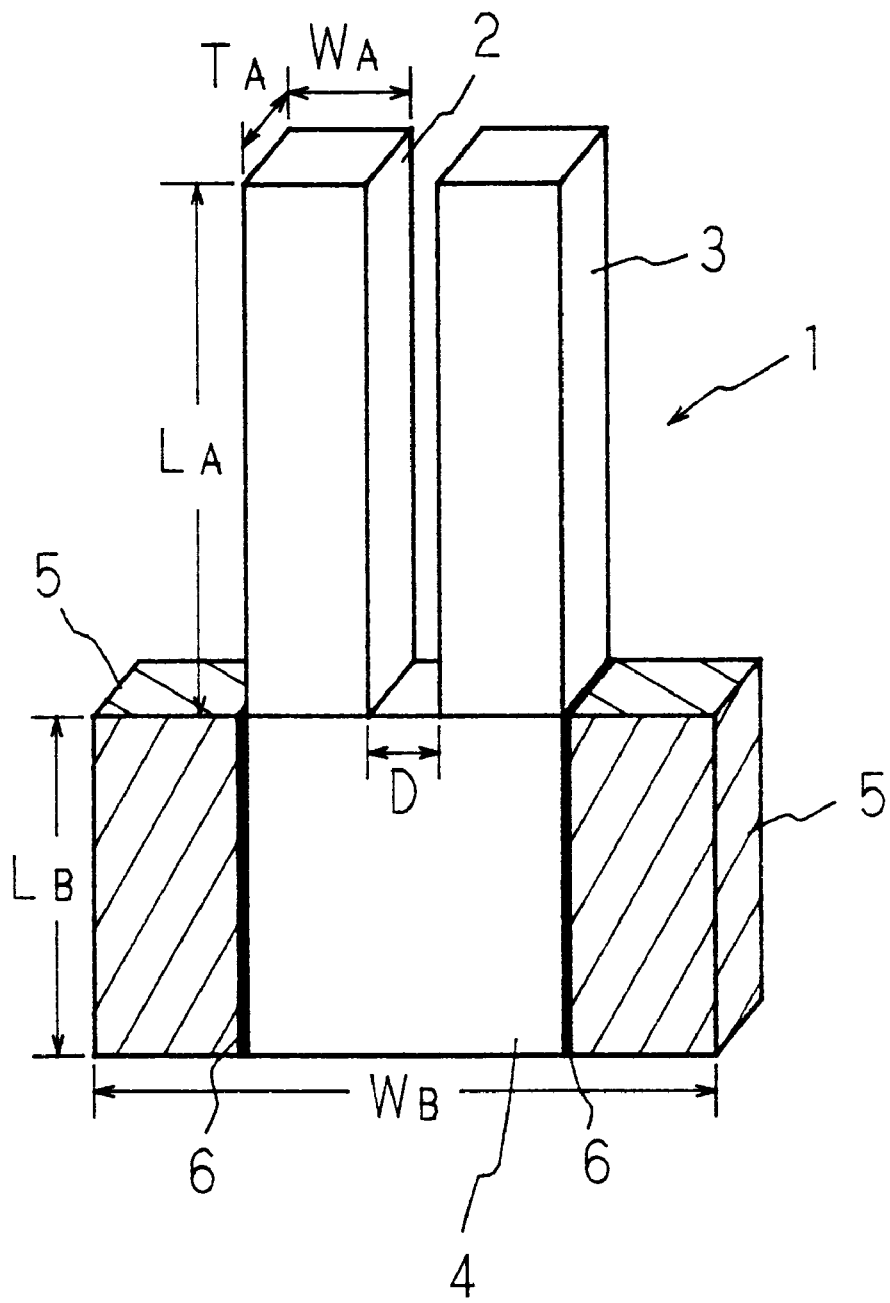
FIG. 11 is a perspective view of the structure of a tuning fork type vibration element of the third embodiment.

As shown in FIG. 11, the third embodiment shows an example where the inertial moment of the base 4 is increased by providing an addition mass unit 5 at both sides of the base 4 via an adhesive layer 6, so as to increase the value of the moment ratio. The addition mass unit 5 must be a rigid member having hardness of 50 kg/cm² or more such as copper in order to be the inertial moment. The inertial moment is increased more effectively as the material of the addition mass unit 5 has a larger density; however, the effect of increasing the inertial moment can be expected if the material is rigid in spite of its low density. The adhesive layer 6 is made of an epoxy resin.

Figure 12:
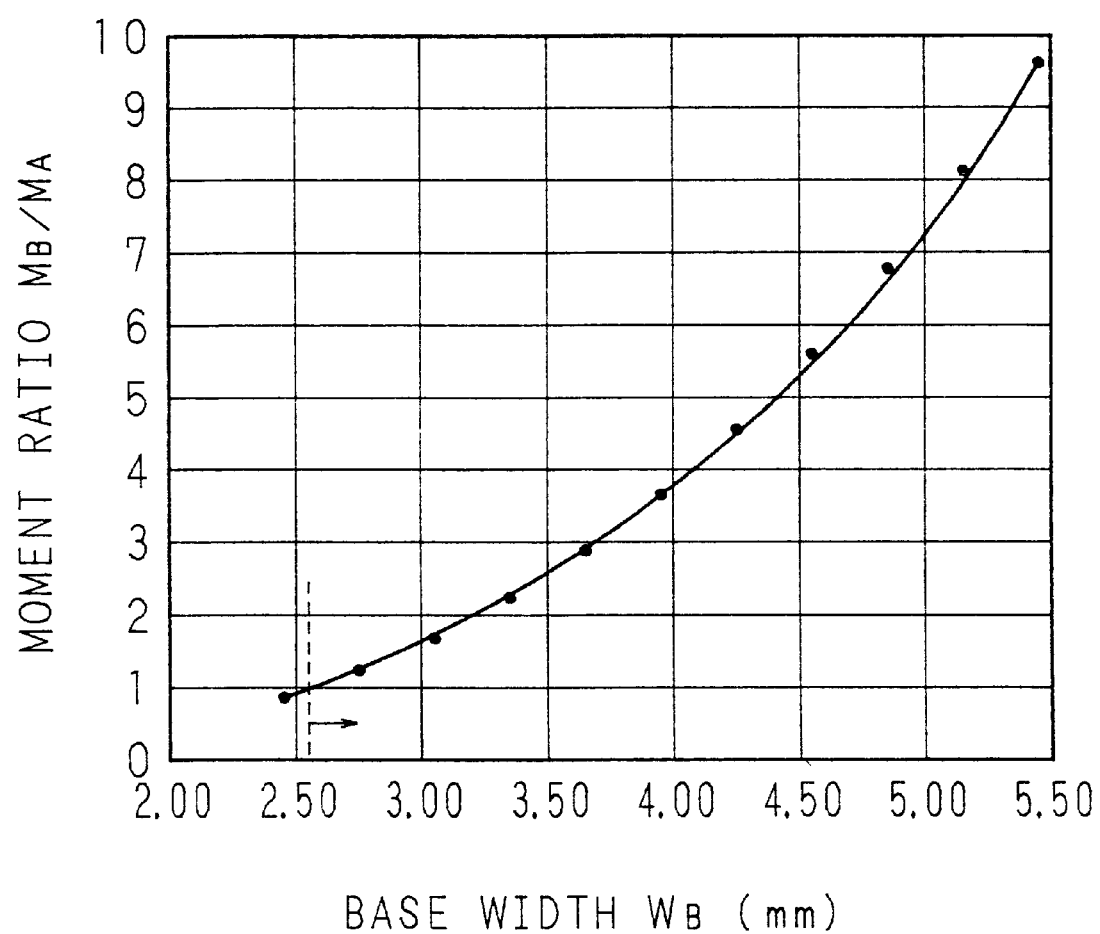
FIG. 12 a graph showing the relationship between the base width $W_B$ including the width of the addition mass unit and the moment ratio $M_B/M_A$.

TABLE 3 shows the results of the inertial moment of the arms 2, 3 (arm moment: $M_A$), the sum of the inertial moments of the base 4 (base moment: $M_B$), and the ratio of the base moment to the arm moment (moment ratio: $M_B/M_A$) when the width of the base 4 (base width $W_B$) to which the copper addition mass unit 5 is attached is varied within the range of 2.45 to 5.45 mm at the intervals of 0.30 mm under the conditions that the sizes of the arms 2, 3 (arm length $L_A$=8.00 mm, arm width $W_A$=1.00 mm, arm thickness $T_A$=1.00 mm, inter-arm distance D=0.45 mm) and the size of the main body of the base 4 (base length $L_B$=4.00 mm and base width $W_B$=2.45 mm) are fixed. In TABLE 3, the base width $W_B$=2.45 mm indicates the property in the case where the addition mass unit 5 is not attached, and the width of the copper addition mass unit 5 which is to be attached is increased by 0.30 mm each. The relationship between the base width $W_B$ and the moment ratio $M_B/M_A$ shown in TABLE 3 is shown in the graph of FIG. 12 where the abscissa and the ordinate indicate the former and the latter, respectively.

TABLE 3

(unit of lenth: mm)

| $L_A$ | $W_A$ | $T_A$ | $L_B$ | $W_B$ | $M_A$ | $M_B$ | $M_B/M_A$ |
|---|---|---|---|---|---|---|---|
| 8.00 | 1.00 | 1.00 | 8.00 | 2.45 | 31.12 | 27.21 | 0.874323722 |
| 8.00 | 1.00 | 1.00 | 8.00 | 2.75 | 31.12 | 38.47 | 1.236437277 |
| 8.00 | 1.00 | 1.00 | 8.00 | 3.05 | 31.12 | 52.49 | 1.686838585 |
| 8.00 | 1.00 | 1.00 | 8.00 | 3.35 | 31.12 | 69.55 | 2.235159037 |
| 8.00 | 1.00 | 1.00 | 8.00 | 3.65 | 31.12 | 89.96 | 2.891030024 |
| 8.00 | 1.00 | 1.00 | 8.00 | 3.95 | 31.12 | 114.02 | 3.664082937 |
| 8.00 | 1.00 | 1.00 | 8.00 | 4.25 | 31.12 | 142.02 | 4.563949168 |
| 8.00 | 1.00 | 1.00 | 8.00 | 4.55 | 31.12 | 174.26 | 5.600260107 |
| 8.00 | 1.00 | 1.00 | 8.00 | 4.85 | 31.12 | 211.06 | 6.782647146 |
| 8.00 | 1.00 | 1.00 | 8.00 | 5.15 | 31.12 | 252.69 | 8.120741677 |
| 8.00 | 1.00 | 1.00 | 8.00 | 5.45 | 31.12 | 299.48 | 9.624175089 |

Figure 13:
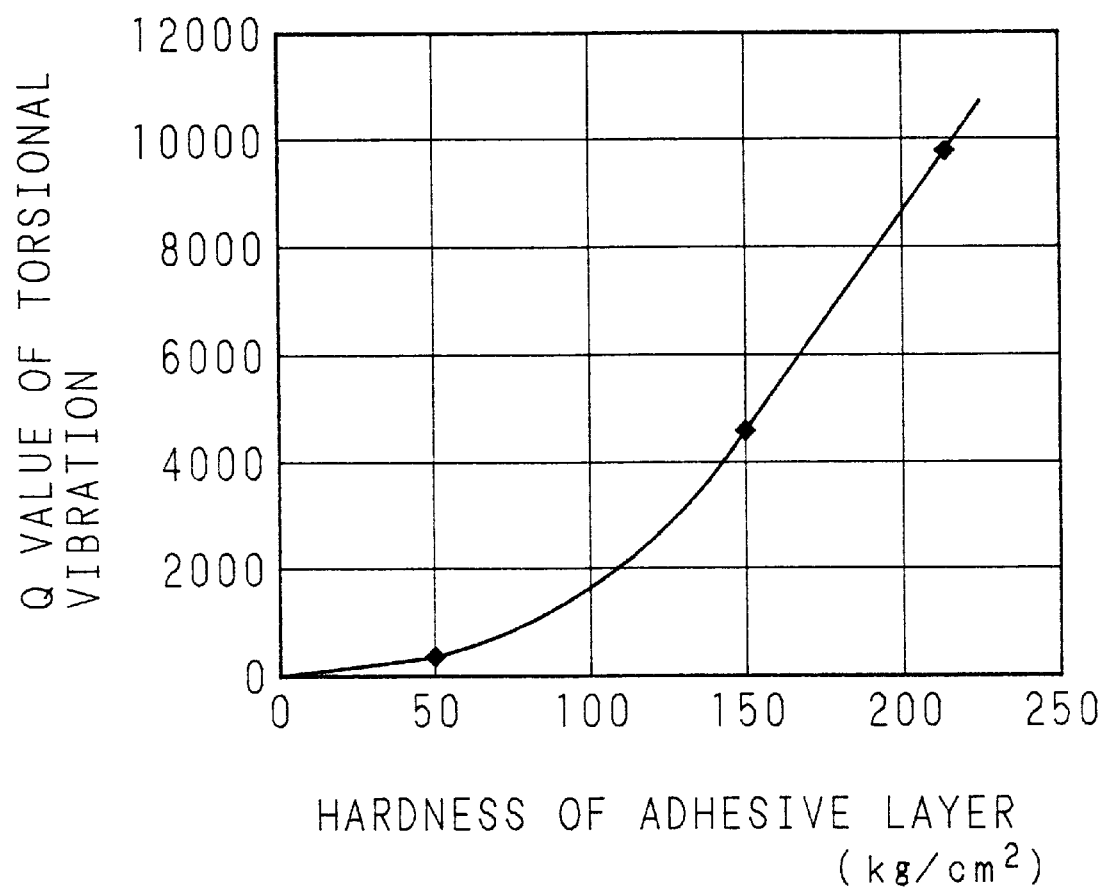
FIG. 13 is a graph showing the relationship between the hardness of the adhesive layer and the Q value of the torsional vibration.

$L_A$: arm length
$W_A$: arm width
$T_A$: arm thickness
$L_B$: base length
$W_B$: base width (including the width of the addition mass unit)
$M_A$: arm moment
$M_B/M_A$: moment ratio
$M_B$: base moment The adhesive layer 6 which is used to attach the above-mentioned addition mass unit 5 to the base 4 must meet the same requirement as the addition mass unit 5, and has hardness of 50 kg/cm$^2$ or more within the usage temperature range of the tuning fork type vibration element 1. The relationship between the hardness of the adhesive layer 6 and the Q value of the torsional vibration is shown in the graph of FIG. 13 where the abscissa and the ordinate indicate the former and the latter, respectively. In the property shown in FIG. 13 the inertial moment of the base 4 is fixed. It is understood that the Q value changes in accordance with the hardness of the adhesive layer 6.

In the above-mentioned example, the addition mass unit 5 made of copper is provided; however, additionally, it can be made of iron, alumina, solder, or other metals.

Figure 14:
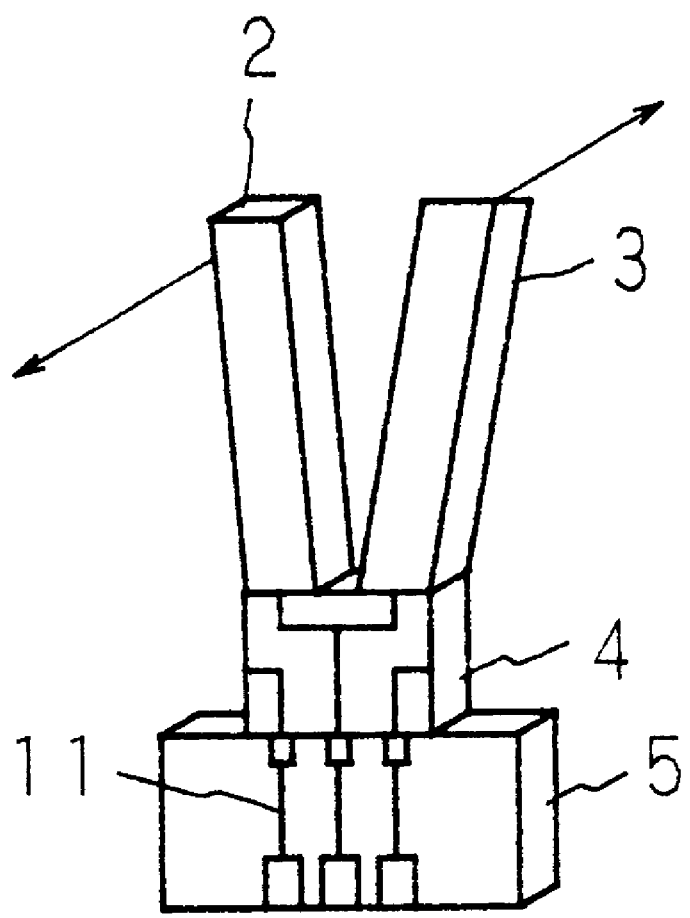
FIG. 14 is a perspective view of another example of the addition mass unit.
Figure 15:
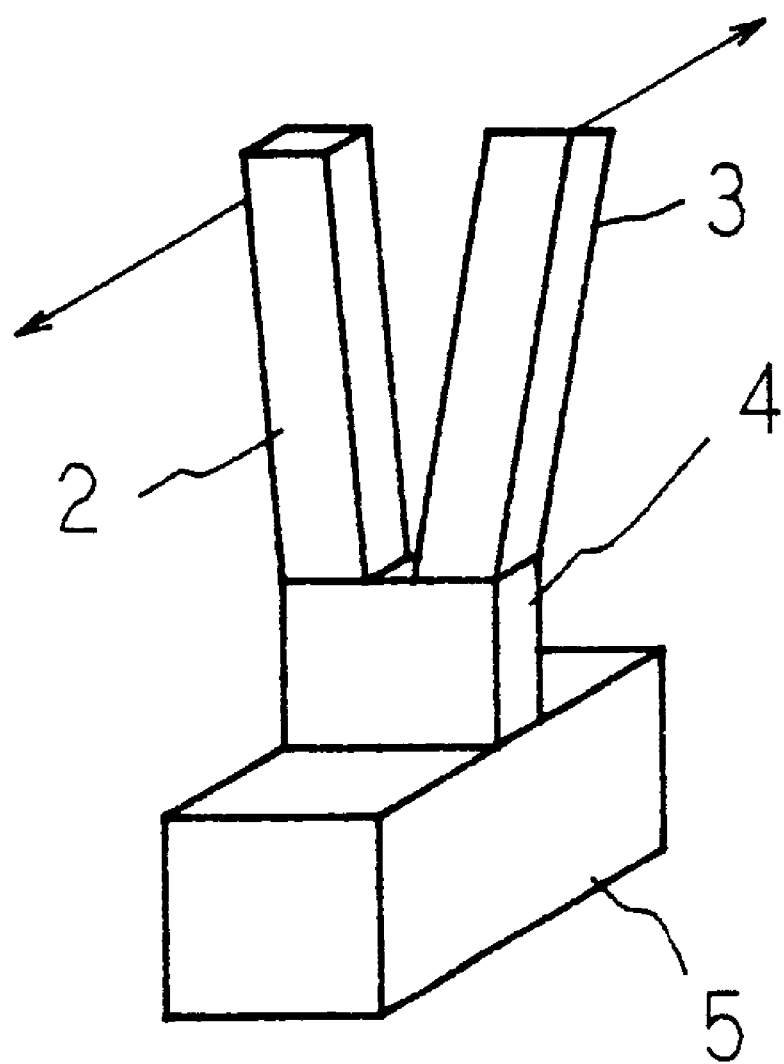
FIG. 15 is a perspective view of further another example of the addition mass unit.
Figure 16:
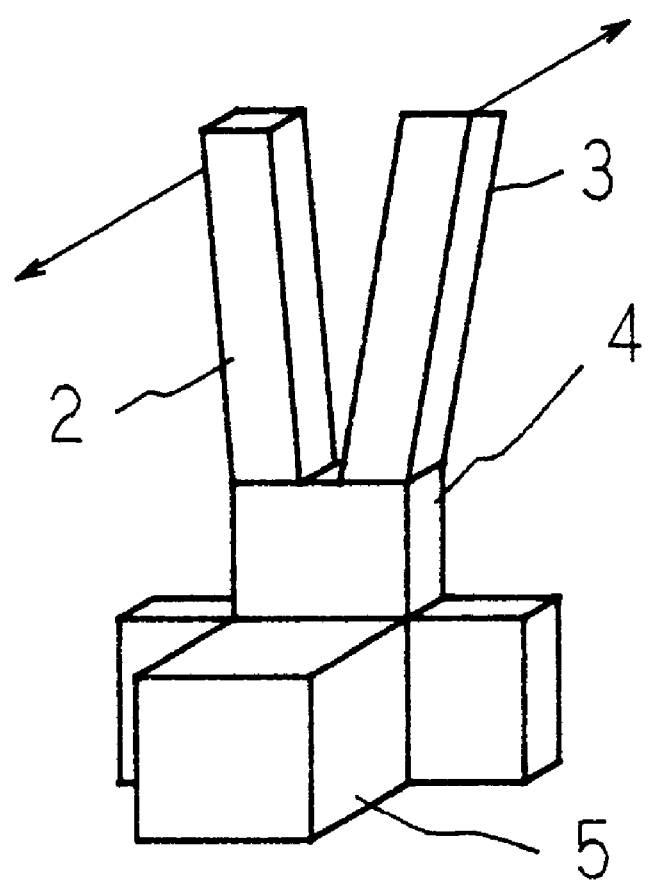
FIG. 16 is a perspective view of further another example of the addition mass unit.
Figure 17:
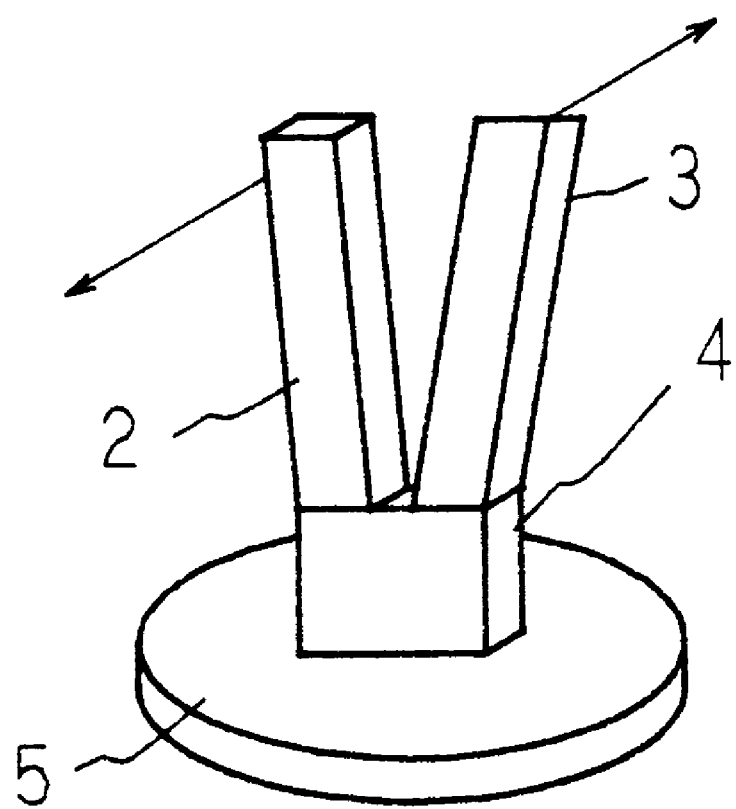
FIG. 17 is a perspective view of further another example of the addition mass unit.

In the above-mentioned example, the addition mass unit 5 is provided at both sides of the base 4; however, it is possible to provide the addition mass unit 5 at the bottom end of the base 4. FIGS. 14 to 17 show such cases. FIG. 14 shows an example where the addition mass unit 5 having a rectangular-parallelepiped form and longitudinally extending in the width direction of the base 4 is provided at the bottom end of the base 4 so as to increase the inertia of the base 4. FIG. 15 shows an example where the addition mass unit 5 having a rectangular-parallelepiped form and longitudinally extending in the thickness direction of the base 4 is provided at the bottom end of the base 4. FIG. 16 shows an example where the addition mass unit 5 having a shape formed by combining the structures shown in FIGS. 14 and 15 is provided at the bottom end of the base 4. FIG. 17 shows an example where the addition mass unit 5 having a disk shape is provided at the bottom end of the base 4.

As shown in FIG. 14, it is possible to provide a drawing electrode 11 on the surface of the addition mass unit 5 via an insulating film so as to connect the drive electrodes and the detection electrodes on the arms 2, 3, with the wires on the support substrate (printed substrate).

EMBODIMENT 4

Figure 18A:
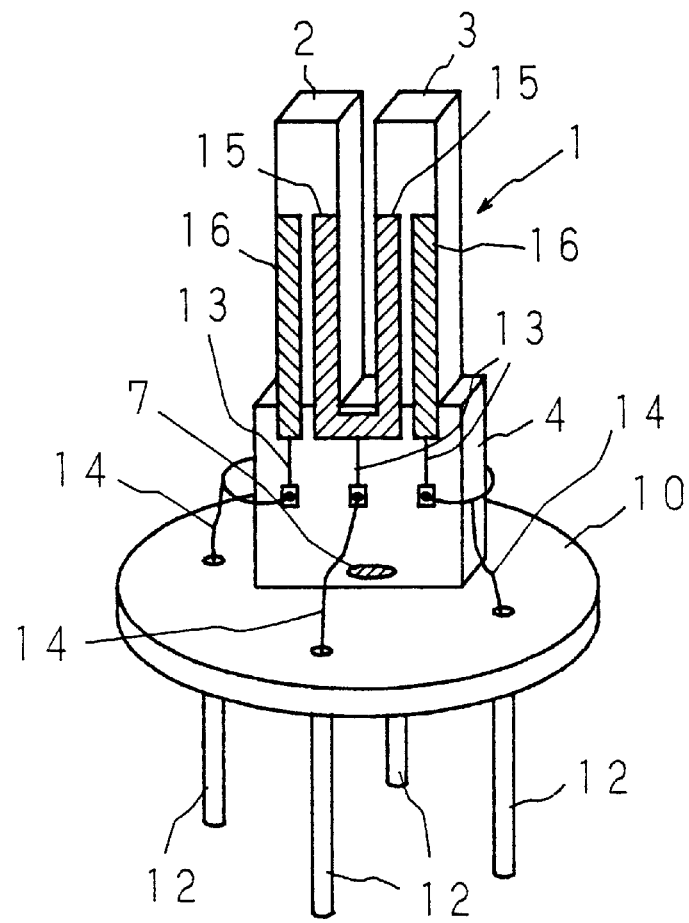
FIGS. 18A and 18B are perspective view and a plane view, respectively, of the structure of a tuning fork type vibration element of the fourth embodiment.
Figure 18B:
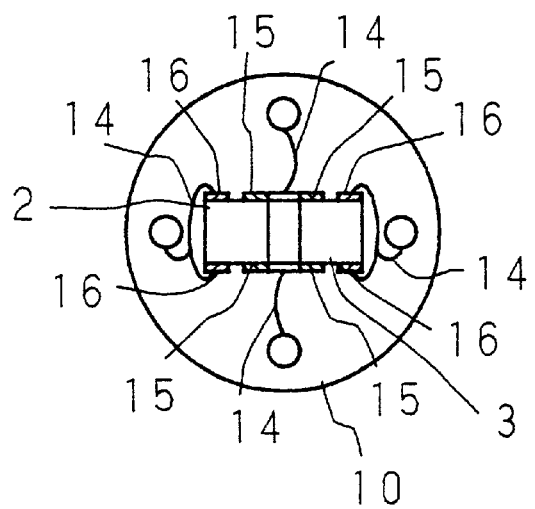

FIGS. 18A, 18B are a perspective view and a top view of the structure of the tuning fork type vibration element 1 of the fourth embodiment. It is necessary to support the turning form type vibration element 1 at the rotation center in order to increase the Q value of the torsional vibration. In the fourth embodiment, a support member 7 for supporting the tuning fork type vibration element 1 (base 4) by a stem 10 having connection pins 12 is provided on the bottom face of the base 4. The support member 7 is made of rubber flexible member in order to isolate the base 4 from the stem 10, thereby preventing the leak of vibration to the stem 10. Drawing electrodes 13 which are connected with the drive electrodes 15 and the detection electrodes 16 formed on the arms 2, 3 are provided on the base 4, and the drawing electrodes 13 and the connection pins 12 of the stem 10 are connected by leads 14.

As described hereinbefore, according to the present invention, the Q value is increased under the conditions that the ratio of the sum of the inertial moments of the base to the inertial moment of the arms is made to be a predetermined value (1.0) or larger by either enlarging the width or the length of the base, or attaching an addition mass unit to the base. As a result, it is possible to realize a tuning fork type vibration element which can increase the Q value without extending the entire length. In addition, a difficult processing of the arms is unnecessary, which leads to high productivity. Since a support member is provided to support the base at the center position of the rotation, a tuning fork type vibration element with a higher Q value can be realized. The use of such a tuning fork type vibration element makes it possible to provide a small and short high-performing tuning fork type vibration gyro.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A tuning fork type vibration element comprising:
   two arms which form a tuning fork and vibrate torsionally; and
   a base which supports said two arms;
      wherein a ratio of a sum of inertial moments of said base to an inertial moment of said two arms is 1.0 or larger, the inertial moment of said two arms being obtained by multiplying the square of a distance from a center axis of torsional vibration of said two arms to a center of gravity of said two arms with a mass of said two arms, and the inertial moment of said base being obtained by multiplying the square of the rotation radius from the center axis of the torsional vibration with a partial mass of said base.

2. The tuning fork type vibration element of claim 1, wherein
a ratio of a width of said base to a width of said arm is 1.0 or larger.

3. The tuning fork type vibration element of claim 1, wherein
a length of said base is longer than a length of said arm.

4. The tuning fork type vibration element of claim 1, wherein
said base includes a base main body and one or more addition mass units, and
said base main body and said one or more addition mass units form the inertial moment of said base.

5. The tuning fork type vibration element of claim 4, wherein
said base further includes an adhesive unit for adhering said base main body to said one or more addition mass units, said adhesive unit having hardness of 50 kg/cm$^2$ or more within a use temperature range.

6. The tuning fork type vibration element of claim 4, wherein
said one or more addition mass units have hardness of 50 kg/cm$^2$ or more.

7. The tuning fork type vibration element of claim 6, wherein
said base further includes an adhesive unit for adhering said base main body to said one or more addition mass units, said adhesive unit having hardness of 50 kg/cm$^2$ or more within a use temperature range.

8. The tuning fork type vibration element of claim 1 further comprising:
a support member which is provided at a substantial center of rotation movement of said base, so as to support said base.

9. A tuning fork type vibration gyro for detecting rotation angular velocity of an object, comprising:
a tuning fork type vibration element, said tuning fork type vibration element comprising:
two arms which form a tuning fork and vibrate torsionally; and
a base which supports said two arms;
wherein a ratio of a sum of inertial moments of said base to an inertial moment of said two arms is 1.0 or larger, the inertial moment of said two arms being obtained by multiplying the square of a distance from a center axis of torsional vibration of said two arms to a center of gravity of said two arms with a mass of said two arms, and the inertial moment of said base being obtained by multiplying the square of the rotation radius from the center axis of the torsional vibration with a partial mass of said base.

* * * * *